United States Patent [19]

Kamp

[11] 4,306,924
[45] Dec. 22, 1981

[54] METHOD AND APPARATUS FOR PRODUCING A PLASTIC CONTAINER HAVING A RECLOSABLE FASTENER

[75] Inventor: Ewald A. Kamp, Chicago, Ill.

[73] Assignee: Union Carbide Corporation, New York, N.Y.

[21] Appl. No.: 134,895

[22] Filed: Mar. 28, 1980

[51] Int. Cl.³ .............................................. B29D 7/02
[52] U.S. Cl. ........................................ 156/66; 150/3;
156/91; 156/244.11; 156/244.21; 156/244.23;
156/498; 156/499; 156/500
[58] Field of Search ................ 156/66, 91, 92, 244.11,
156/244.22, 244.23, 244.24, 244.25, 498, 499,
500; 24/201 C

[56] References Cited

U.S. PATENT DOCUMENTS

| Re. 29,208 | 5/1977 | Naito | 156/91 |
|---|---|---|---|
| 3,338,284 | 8/1967 | Ausnit | 150/3 |
| 3,399,096 | 8/1968 | Ranger | 156/244.23 |
| 3,462,332 | 8/1969 | Goto | 156/244.11 |
| 3,532,571 | 10/1970 | Ausnit | 156/91 |
| 3,846,209 | 11/1974 | Howard | 156/502 |
| 3,848,035 | 11/1974 | Behr | 264/209 |
| 3,904,468 | 9/1975 | Noguchi | 156/500 |
| 3,948,705 | 4/1976 | Ausnit | 156/66 |
| 4,101,355 | 7/1978 | Ausnit | 156/500 |

*Primary Examiner*—Caleb Weston
*Attorney, Agent, or Firm*—Real J. Grandmaison; Harrie M. Humphreys; John C. LeFever

[57] ABSTRACT

An apparatus for producing a plastic container having occludable closure strips comprises a source for the closure strips, a rotatable casting cylinder having a pair of spaced apart circumferential grooves defined therein, a mechanism for advancing the closure strips to the casting cylinder, an extruder for casting a plastic film onto the casting cylinder so that it becomes connected to base portions of the closure strips, and a chill roll for receiving the combination of plastic film and closure strips to provide cooling.

10 Claims, 4 Drawing Figures

FIG. 1
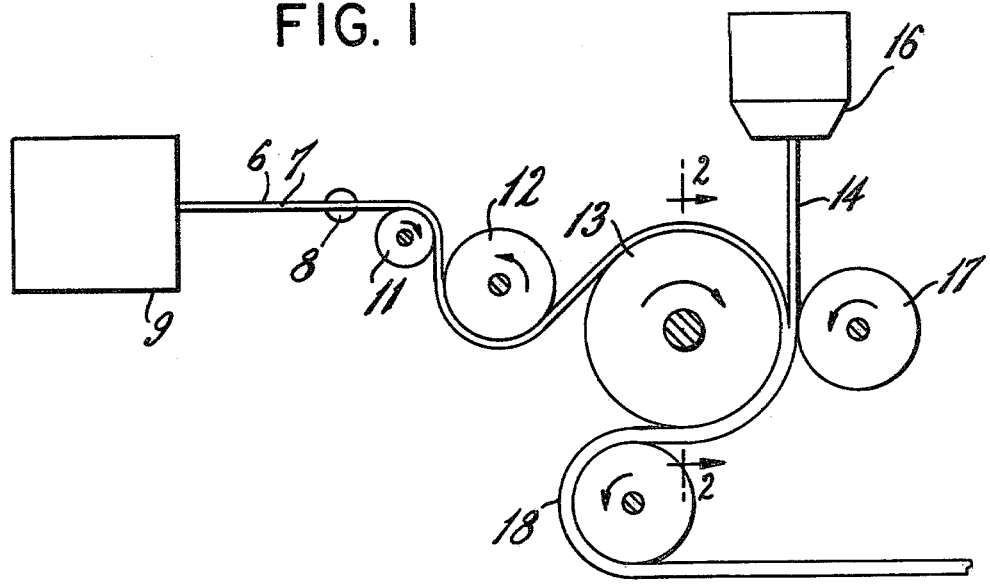
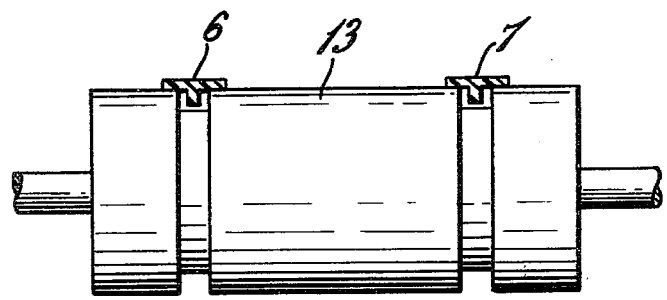
FIG. 2
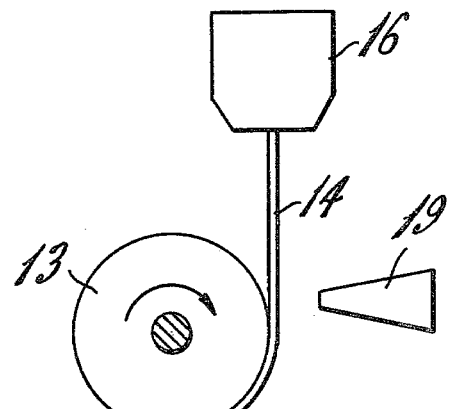
FIG. 3
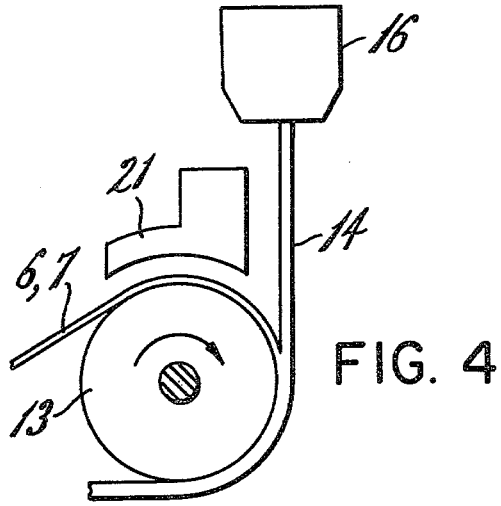
FIG. 4

METHOD AND APPARATUS FOR PRODUCING A PLASTIC CONTAINER HAVING A RECLOSABLE FASTENER

This invention relates to a plastic container having a reclosable fastener.

Generally, plastic containers which feature reclosable fasteners are well known and are widely used by consumers and industry. This popular use has provided a strong impetus for the development of improved manufacturing equipment and methods for economical operations as well as products which have appeal in the marketplace.

One prior art method is described in the U.S. Pat. No. 3,846,209 to Howard. The method of joining multiple stock components together as disclosed in this patent can result in frequent stock changes and thereby reduce manufacturing efficiency.

Another prior art method is described by U.S. Pat. No. Re. 29208 to Naito. This patent disclosed a blown film die which defines both a tubular film and closure elements for the fastener. Such integral extrusion appears to have potential advantages, but it is pointed out in U.S. Pat. No. 3,848,035 to Behr that the integral extrusion in extremely difficult to carry out. The U.S. Pat. No. 3,338,284 to Ausnit also discloses an integrally extruded sheet and fastener for a container but does not consider any method or equipment for producing the article.

The U.S. Pat. No. 3,904,468 to Noguchi discloses a method in which closure strips for a fastener are freshly extruded onto a heated film and pressed into the film with nip rolls. The U.S. Pat. No. 3,462,332 to Goto discloses slot casting film onto a chill roll and extruding the closure strips of the fastener onto the hot film to connect them to the film. The U.S. Pat. No. 4,101,355 to Ausnit discloses connecting together prefabricated film and a prefabricated fastener and the U.S. Pat. No. 3,532,571 to Ausnit discloses connecting a prefabricated preheated fastener to a freshly extruded film.

All of these patents present problems in manufacturing, such as twisting of the closure strips, or positioning of the closure strips, or rate of operation without distortions, or other problems which reduce speed and increase costs.

The instant invention overcomes these problems by the implementation of a surprising method and apparatus.

A first principal embodiment of the invention is an apparatus for producing a plastic film connected to a pair of occludable closure strips, each having profile and base portions; comprising feeding means for supplying the closure strips; a rotatable casting cylinder having a pair of spaced apart circumferential grooves defined therein; advancing means for advancing the closure strips to the casting cylinder so that the respective profile portions extend into the respective grooves; extruding means for casting a plastic film onto the casting cylinder so that the plastic film becomes connected to the base portions; urging means for pressing the plastic film against the base portions; and cooling means for receiving the combination of the plastic film and closure strips to provide cooling.

Another embodiment of the invention features heating means for preheating the closure strips prior to the closure strips contacting the casting cylinder.

Another embodiment of the invention features the cooling means comprising a chill roll.

A further embodiment of the invention features the urging means comprising a chill roll.

Yet another embodiment of the invention features the urging means comprising an air knife. An air knife is a known device in the form of an air blower having a slotted nozzle for directing an airstream produced by the blower.

A second principal embodiment of the invention is a method for producing a plastic film connected to a pair of occludable closure strips, each having profile and base portions; comprising the steps of supplying the closure strips; advancing the closure strips to a rotatable casting cylinder having a pair of spaced apart circumferential grooves so that the respective profile portions extend into the respective grooves; extruding a plastic film onto the casting cylinder so that it becomes connected to the base portions; and thereafter cooling the combination of the plastic film and closure strips.

Another embodiment of the invention as set forth in the second principal embodiment features the step of preheating the closure strips before the closure strips are advanced to the casting cylinder.

Another embodiment is the further step of eliminating air entrapment between the plastic film and the closure strips.

Further advantages of the invention will be set forth in part in the following and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a diagrammatic elevational view of one embodiment of the invention;

FIG. 2 is a sectional view along the line 2—2 of the casting cylinder of FIG. 1;

FIG. 3 is another embodiment of a portion of the invention of FIG. 1; and

FIG. 4 is a further embodiment of a portion of the invention of FIG. 1.

In carrying the invention into effect, several embodiments have been selected for illustration in the accompanying drawings and for description in this specification, reference being had to the Figures.

In FIG. 1, occludable closure strips 6 and 7 which define a fastener 8 are supplied from a supply source 9. The source 9 can be a roll of prefabricated closure strips or an in-line operation which supplies closure strips.

Reference is had to the co-pending patent application Ser. No. 892,432, filed Mar. 31, 1978, now U.S. Pat. No. 4,212,337, whose disclosure is incorporated herein by reference. The U.S. Pat. No. 4,212,337, discloses a preferred fastener for the instant invention because the closure strips are u-shaped channels.

A control roll 11 feeds the closure strips 6 and 7 to an optional heating means 12 for preheating the base portions of the closure strips 6 and 7. The heating means 12 can be a rotating heated roll as shown or a hot air blower or the like. The closure strips 6 and 7 then move to a rotating casting cylinder 13 which has a pair of spaced apart circumferential grooves as can be seen from FIG. 2. The temperature of the casting cylinder 13 depends on the resins used for the process. It is important to avoid raising the temperature of the profile portions to a level at which distortions can occur. The temperature of the casting cylinders must be sufficient to achieve a good adhesion between the closure strips 6 and 7 and the plastic film 14.

The plastic film 14 is slot extruded from extruding means 16 onto the casting cylinder 13 to become connected to the closure strips 6 and 7.

Urging means such as roll 17 provides cooling and lay-flat control and presses the plastic film 14 against the base portions of the closure strips 6 and 7. A cooling means such as, chill roll 18 provides cooling before the combination of the plastic film 14 and the closure strips 6 and 7 is advanced for further operations to produce a plastic container.

The roll 17 can be replaced or supplemented by an air knife 19 as shown in FIG. 3.

FIG. 4 shows a portion of the embodiment of FIG. 1 with a suction device 21 near the casting roll 13 and the extruding means 16. The suction device 21 is positioned to draw air away from the point that the closure strips 6 and 7 contact the plastic film 14 in order to minimize air entrapment. This improves the bond between the closure strips 6 and 7 and the plastic film 14.

I wish it to be understood that I do not desire to be limited to the exact details for obvious modifications will occur to a person skilled in the art.

Having described the invention, what I claim as new and desire to be secured by Letters Patent, is as follows:

1. An apparatus for producing a plastic film connected to a pair of occludable closure strips, each of said closure strips having profile and base portions; said apparatus comprising:

feeding means for supplying said closure strips;
   a rotatable casting cylinder having a pair of spaced apart circumferential grooves defined therein;
   advancing means for advancing said closure strips to said casting cylinder so that respective unoccluded profile portions of said closure strips extend into the respective grooves of said casting cylinder;
   extruding means for casting a plastic film onto said casting cylinder so that said plastic film becomes connected to said base portions of said closure strips;
   urging means for pressing said plastic film against said base portions; and
   cooling means for receiving the combination of said plastic film and closure strips to provide cooling.

2. The apparatus as claimed in claim 1, further comprising heating means for heating said closure strips before said closure strips are positioned onto said casting cylinder.

3. The apparatus as claimed in claim 1, wherein said cooling means comprises a chill roll.

4. The apparatus as claimed in claim 1, wherein said urging means comprises a chill roll.

5. The apparatus as claimed in claim 1, wherein said urging means comprises an air knife.

6. The apparatus as claimed in claim 1, wherein said closure strips are u-shaped channels.

7. The apparatus of claim 1, further comprising a suction device wholly separate and distinct from and external to said casting cylinder, urging means and cooling means and positioned to minimize air entrapment between said plastic film and said closure strips when they are being connected to each other.

8. A method for producing a plastic film connected to a pair of occludable closure strips, each of said closure strips having profile and base portions; said method comprising the steps of supplying said closure strips;
   advancing said closure strips to a rotatable casting cylinder having a pair of spaced apart circumferential grooves so that respective unoccluded profile portions of said closure strips extend into the respective grooves of said casting cylinder;
   extruding a plastic film onto said casting cylinder so that said plastic film becomes connected to said base portions of said closure strips; and
   thereafter, cooling the combination of said plastic film and closure strips.

9. The method of claim 8, further comprising heating said closure strips before said closure strips are positioned onto said casting cylinder.

10. The method of claim 8, further comprising positioning suctioning means wholly separate and distinct from and external to said casting cylinder to minimize air entrapment between said plastic film and said closure strips when they are being connected to each other.

* * * * *